3,331,790
PROCESS FOR THE PRODUCTION OF FOAM
PLASTICS
Hans Scheurlen, Burscheid, and Karl-Heinz Müller, Leverkusen, Germany, assignors to Farbenfabriken Bayer Aktiengesellschaft, Leverkusen, Germany, a German corporation
No Drawing. Filed July 26, 1963, Ser. No. 297,977
Claims priority, application Germany, July 28, 1962, F 37,456
9 Claims. (Cl. 260—2.5)

This invention relates to a process for the production of foam plastics and to a blowing agent used therefore.

In the production of foam plastics from PVC (polyvinyl chloride) plastisols, the blowing agents used are almost exclusively chemical, i.e. compounds which split off gases, particularly nitrogen, at elevated temperatures due to decomposition. Coloured and/or odoriferous components are easily formed in these decomposition reactions, and these components are a disadvantage in the subsequent applications of the foam plastic. These foam plastics are relatively sensitive to these undesirable side reactions because these chemical blowing agents have to be used in quantities up to 15%, calculated on the plastisol, owing to the relatively small amount of gas they yield. Furthermore, it has been found that in the production of open celled foam plastics by forming plastisols, containing blowing agents, at atmospheric pressure, it is extremely difficult to prevent collapse of the foam at the decomposition temperature of the blowing agent, because the stability of the system which has to be foamed is seriously diminished due to the reduced viscosity of the plastisol at the elevated temperature. It has therefore already been proposed (see British patent specification 799,750, U.S. patent specification 2,909,493), to foam PVC-plastisol at room temperature or only slightly elevated temperature with the aid of a mixture of alkali metal borohydrides and water. These two substances react together according to the equation

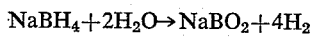

and therefore give a very good gas yield which, at 2300 ml./g. $NaBH_4$, is more than six times as great as with the usual chemical blowing agents.

In addition, the borohydride and its reaction products are, of course, completely colourless and odourless, and as the hydrogen evolved has a higher thermal conductivity than other gases such as nitrogen, it enables the foam plastic to get more rapidly.

It is further known that the reaction velocity between borohydride and water can be accelerated as desired by lowering the pH value of the plastisol. Mineral acids and carboxylic acids as well as carboxylic acid anhydrides are advantageously used for this purpose. When plastisols are foamed with the aid of borohydride and water, however, two major difficulties are encountered which are a great obstacle to further processing, namely:

(1) The addition of water to PVC-plastisols in most cases (depending on the quantity of water added and on the type of plasticiser used) has the consequence that the paste thickens due to thixotropy. A paste of this kind does not give a uniform pore structure when foamed and can no longer be distributed evenly in the mould. In cases where thixotropy is ignored, the plastisol which contains water is not stable, i.e. if the plastisol is left to stand for some time, water separates out on the surface owing to its incompatibility.

(2) The alkali metal borite formed in the reaction between borohydride and water, being the salt of a strong base with a weak acid, is very strongly alkaline. This alkalinity is apparent in a foam produced by this process and it has the effect that after prolonged storage, partial saponification of the ester plasticisers in the plastisol occurs. In addition, a considerable number of the dyestuffs and pigments used in PVC-plastisols are not stable to alkali. In some cases, the alkali even causes decomposition of PVC by splitting off HCl when the foam gels, which occurs at temperatures of about 160 to 180° C. The aim now is to buffer or even neutralise the alkali produced, by adding components which are acid in reaction. However, since acids or substances which are acid in reaction have a powerfully accelerating effect on the reaction velocity of borohydride and water, as already mentioned above, the buffering or neutralising substance can only be used in very small quantities which are invariably insufficient.

It is an object of the present invention to overcome the aforementioned difficulties. A further object is to provide a foam plastic with good properties. Further objects will appear hereinafter.

It has now been found that the aforementioned objects and others can be attained if, in the production of foam plastics from polyvinyl chloride plastisols or from plastisols of copolymers having a major proportion of vinyl chloride, as a blowing agent an alkali borohydride and an organic compound which contains hydroxy groups are used.

The hydroxy compounds are also able to react with borohydrides splitting off $H_2$, but their reaction velocity is much lower than that of water, so that it is possible to use a larger quantity of acid or of substances which form acids, for the neutralisation or buffering of the alkali liberated in the reaction. Further, these organic hydroxy compounds are compatible with PVC plastisols, i.e. no thixotropy of the paste nor separation of these components from the paste are observed. By this method, foam plastics are obtained which are completely neutral in reaction. Furthermore, it is observed that much finer and more uniform pores are formed, owing to the fact that the PVC paste and the organic hydroxy compound are highly compatible with each other. These very fine pores have the effect that the ungelled foam is very stable, i.e. will not collapse when the substance is poured into moulds or subsequently gelled by heating. The polyhydric alcohols which are preferably used for foaming the plastic will not exude from the finished foam plastic and in addition have such a low volatility that they will not evaporate at the temperature at which the foam plastic is gelled, whereas in the original process, the water that has not reacted easily leads to corrosion in the heating apparatus and to loss of heat, due to the formation of steam.

Organic hydroxy compounds which are used for the process of the invention are advantageously monohydric or polyhydric alcohols such as, for example, ethylene glycol, diethylene glycol, triethyleneglycol or glycerol. In addition, however, practically any other substances which contain OH groups are suitable, and their choice may be dictated from the point of view of the compatibility with special plasticisers or the higher or lower reaction velocity with the borohydride. Thus, for example, by using aminoalcohols on the one hand or hydroxycarboxylic acids on the other, the reaction can, in some circumstances, be adjusted to a certain velocity without the additional use of the acid. The same applies also to the use of, for example, di-sec.-butyl phosphate, in which the free acid radical reacts with borohydride and the ester itself is ideally compatible with plasticised PVC.

As organic hydroxy compounds there are used preferably hydrocarbons which contain up to 12 carbon atoms and 1 to 3 hydroxy groups. The hydrocarbons can be substituted e.g. by carboxylic groups, sulfonic acid groups, phosphoric acid groups or by esters of the aforementioned acids with alcohols which contain e.g. 1 to 9 carbon atoms. The hydrocarbons can be substituted furthermore by primary, secondary or tertiary amino groups or by fluorine or chlorine or ether groups whereby the ether radical contains preferably 1 to 9 carbon atoms.

Preferred alkali metal borohydrides for the process of the invention include potassium borohydride and in particular sodium borohydride. The preferred method of using the borohydrides as blowing agents consists in dispersing them in the plasticiser required for the preparation of the plastisol, this plasticiser being then mixed with PVC. It has been found that borohydrides can be dispersed very quickly and uniformly with the aid of mixing apparatus suitable for the preparation of the plastisol, although the borohydrides are insoluble or only partly soluble in the plastisol components. The mixtures are stable also in the sense that the borohydride does not separate out, so that the homogeneity of the paste will not be impaired.

For the preparation of foam plastics from plastisols, it is advisable to leave the addition of hydroxy compound and, where necessary, acid to the plastisol to the last to obtain a good foam. To produce a foam mixture as rapidly as possible, it has been found advantageous to separate the plastisol that is to be used, and to add the borohydride to one half of the plastisol and the hydroxy compound, where necessary, the acid to the other half. Each part is completely stable on its own, and as the two parts have the same viscosity and are easily mixed together, this provides a very simple and thorough method of preparing the finished foam mixture. It has been found advantageous, in this connection, to introduce the two plastisols into a common mixing chamber through two separate supply or dosing devices such as gear wheel pumps, the plastisols being then continuously mixed in the mixing chamber, e.g. by means of a high speed stirrer, and then poured into the moulds where they foam up. The borohydrides and the organic hydroxy compounds are used preferably in a molar ratio of 0.5 to 4 mols of the hydroxy groups to 1 mol of the borohydride. If desired there can be used higher amounts of the hydroxy groups such as e.g. 8 mols of the hydroxy group per 1 mol of the borohydride.

Apart from polyvinyl chloride plastisols, plastisols of copolymers containing a predominant amount of vinyl chloride are also suitable for the process of the invention. These copolymers may, in addition, contain the usual components for such copolymers, e.g. vinyl acetate or vinylidene chloride.

The method of carrying out the process of the invention can be seen from the following examples which are not given as limitation but merely as explanation of the process, since it is not possible to give all possible applications in detail.

*Example 1*

A paste consisting of 100 parts by weight of a PVC (K-value 66–75) emulsion-type, 30 parts by weight of an alkylphenyl or cresylsulphonate, 70 parts by weight of tricresylphosphate, 2 parts by weight of sodium borohydrides, 1.5 parts by weight of glycerol and 0.1 part by weight of acetic acid is prepared on a three-roller mill and poured into an open mould having a base measuring 10 x 10 cm. and side walls 15 cm. in height. The paste begins to foam slowly soon after it is poured in, and is heated for 45 minutes at 175° C. in an oven to gel it. This produces an elastic foam plastic which is mainly open celled and which has a regular, very fine cell structure and a weight per unit volume of about 150 kg./m.$^3$.

*Example 2*

Two pastes of the following composition are prepared (amounts in weight-percents):

|  | A | B |
|---|---|---|
| PVC (as in Example 1) | 100.0 | 100.0 |
| Alkylphenyl or cresylsulphonate | 30.0 | 30.0 |
| Tricresylphosphate | 80.0 | 80.0 |
| Sodium borohydride | 4.0 | |
| Ethylene glycol | | 6.0 |
| Acetic acid | | 0.4 |

50 parts by weight each of pastes A and B are mixed in a rapid stirrer and poured into a mould described in Example 1. After heating for 20 minutes at 70° C. and then 40 minutes at 140° C., an open-cell elastic foam plastic is obtained which differs from that described in Example 1 by having larger cells and a softer consistency.

*Example 3*

Equal parts of the following pastes (amounts in weight-percents):

|  | A | B |
|---|---|---|
| PVC | 100.0 | 100.0 |
| Dioctylphthalate | 30.0 | 30.0 |
| Tricresyl phosphate | 10.0 | 10.0 |
| Sodium borohydride | 5.0 | |
| Glycerol | | 3.0 |
| Acetic acid | | 0.2 | are mixed intensively and poured into an open mould. When the mixture has foamed up and been heated (20 minutes at 70° C. and then 40 minutes at 140° C.), a semi-rigid foam plastic having a weight per unit volume of about 250 kg./m.$^3$ and a cell diameter of 2 to 3 mm. is obtained.

*Example 4*

Equal parts of the following pastes (amounts in weight-percents):

|  | A | B |
|---|---|---|
| PVC (emulsion type) | 100.0 | 100.0 |
| Alkylphenyl or cresylsulphonate | 40.0 | 40.0 |
| Tricresylphosphate | 70.0 | 70.0 |
| Sodium borohydride | 2.0 | |
| Ethylene glycol | | 5.0 |
| Acetic acid | | 0.5 | are introduced under pressure, each by a gear wheel pump, into a mixing chamber which is fitted with a high speed stirrer. A still fluid foam of the consistency of whipped cream, which can easily be distributed evenly in a mould is obtained at the top of the mixing chamber. By heating it for 45 minutes at 140° C., an elastic foam plastic is produced which contains mostly open, medium-size cells. If the same pastes are heated separately at about 45° C. for 20 to 30 minutes before the mixing process, a foam plastic in which the cells have the same appearance as in natural sponge is obtained after mixing and gelation.

*Example 5*

Equal parts of the following pastes (amounts in weight-percents):

|  | A | B |
|---|---|---|
| PVC (emulsion polymer) | 100.0 | 100.0 |
| Alkylphenyl or cresylsulphonate | 40.0 | 40.0 |
| Tricresylphosphate | 70.0 | 70.0 |
| Sodium borohydride | 4.0 | |
| Butanetriol | | 3.0 |
| Acetic acid | | 0.5 | are worked up as explained in Example 4. A much more finely cellular foam than that obtained by the process described in Example 4 is obtained after heating.

*Example 6*

Equal parts of the following pastes (amounts in weight-percents):

|                          | A     | B     |
|--------------------------|-------|-------|
| PVC (emulsion polymer)   | 100.0 | 100.0 |
| Dioctylphthalate         | 40.0  | 40.0  |
| Tricresylphosphate       | 70.0  | 70.0  |
| Glycerol monoacetate     |       | 10.0  |
| Sodium borohydride       | 2.0   |       |
| Phthalic anhydride       |       | 2.0   | are mixed as described in Example 4 and applied in a layer of about 1 cm. thickness on an endless band. The band travels at the rate of 2 m./min. through a gelation channel heated to 180° C. An endless foam block of about 4 cm. thickness and containing mostly open cells is obtained.

*Example 7*

Equal parts of the following pastes (amounts in weight-percents):

|                               | A     | B     |
|-------------------------------|-------|-------|
| PVC (emulsion polymer)        | 100.0 | 100.0 |
| Alkylphenyl or cresylsulphonate | 40.0 | 40.0  |
| Tricresylphosphate            | 70.0  | 70.0  |
| Sodium borohydride            | 2.0   |       |
| Salicylic acid                |       | 10.0  | are homogenised in a rapidly rotating manually operated stirrer and poured into a mould of the kind described in more detail in Example 1. After heating for 45 minutes at 175° C., an extremely finely porous, elastic, open-celled foam is obtained. In this example, salicylic acid acts both as hydroxy compound and as acid.

*Example 8*

Equal parts of the following pastes (amounts in weight-percents):

|                               | A     | B     |
|-------------------------------|-------|-------|
| PVC (emulsion polymer)        | 100.0 | 100.0 |
| Alkylphenyl or cresylsulphonate | 40.0 | 40.0  |
| Tricresylphosphate            | 70.0  | 70.0  |
| Sodium borohydride            | 2.0   |       |
| Dibutylphosphate              |       | 20.0  | are applied on to an endless band after they have been mixed, as described in Example 6, and heated in a gelation channel at 180° C. A soft, elastic, open-celled foam with an excellent uniform cell structure is obtained.

What is claimed is:
1. A process for producing foam plastics which comprises forming a mixture comprising
   (1) a member selected from the group consisting of polyvinyl chloride plastisol and a plastisol of a copolymer of vinyl chloride and a member selected from the group consisting of vinyl acetate and vinylidene chloride, said copolymer containing a predominant proportion of vinyl chloride,
   (2) an alkali metal borohydride, and
   (3) an organic hydroxy compound which reacts with alkali metal borohydride to form hydrogen as a by-product, said organic hydroxy compound being selected from the group consisting of hydrocarbons containing up to 12 carbon atoms and substituted with from 1 to 3 hydroxy groups and substituted hydrocarbons containing up to 12 carbon atoms wherein said substituents include from 1 to 3 hydroxy groups and a member selected from the group consisting of amino, fluoro, chloro, ether radicals containing from 1 to 9 carbon atoms and carboxylic, sulfonic and phosphoric acid radicals and esters of said acid radicals with alcohols containing from 1 to 9 carbon atoms, and heating resultant foam mixture to gel the same.
2. The process of claim 1 wherein said organic hydroxy compound is a polyhydric alohol.
3. The process of claim 2 wherein said organic hydroxy compound is ethylene glycol.
4. The process of claim 2 wherein said organic hydroxy compound is glycerol.
5. The process of claim 2 wherein said organic hydroxy compound is butane triol.
6. The process of claim 2 wherein said organic hydroxy compound is glycerol monoacetate.
7. The process of claim 1 wherein said organic hydroxy compound is a hydroxy carboxylic acid.
8. The process of claim 7 wherein said hydroxy carboxylic acid is salicylic acid.
9. The composition of matter comprising a mixture of
   (1) a member selected from the group consisting of polyvinyl chloride plastisol and a plastisol of a copolymer of vinyl chloride and a member selected from the group consisting of vinyl acetate and vinylidene chloride, said copolymer containing a predominant proportion of vinyl chloride,
   (2) an alkali metal borohydride, and
   (3) an organic hydroxy compound which reacts with alkali metal borohydride to form hydrogen as a by-product, said organic hydroxy compound being selected from the group consisting of hydrocarbons containing up to 12 carbon atoms and substituted with from 1 to 3 hydroxy groups and substituted hydrocarbons containing up to 12 carbon atoms wherein said substituents include from 1 to 3 hydroxy groups and a member selected from the group consisting of amino, fluoro, chloro, ether radicals containing from 1 to 9 carbon atoms and carboxylic, sulfonic and phosphoric acid radicals and esters of said acid radicals with alcohols containing from 1 to 9 carbon atoms.

References Cited

UNITED STATES PATENTS 2,909,493  10/1959  Bush _____ 260—2.5
3,084,127  4/1963  Vakousky _____ 260—2.5

FOREIGN PATENTS 1,006,201  9/1965  Great Britain.

MURRAY TILLMAN, *Primary Examiner.*

M. FOELAK, *Assistant Examiner.*